W. J. THOMSON.
DRAFT EQUALIZER.
APPLICATION FILED AUG. 9, 1910.
1,051,528.
Patented Jan. 28, 1913.
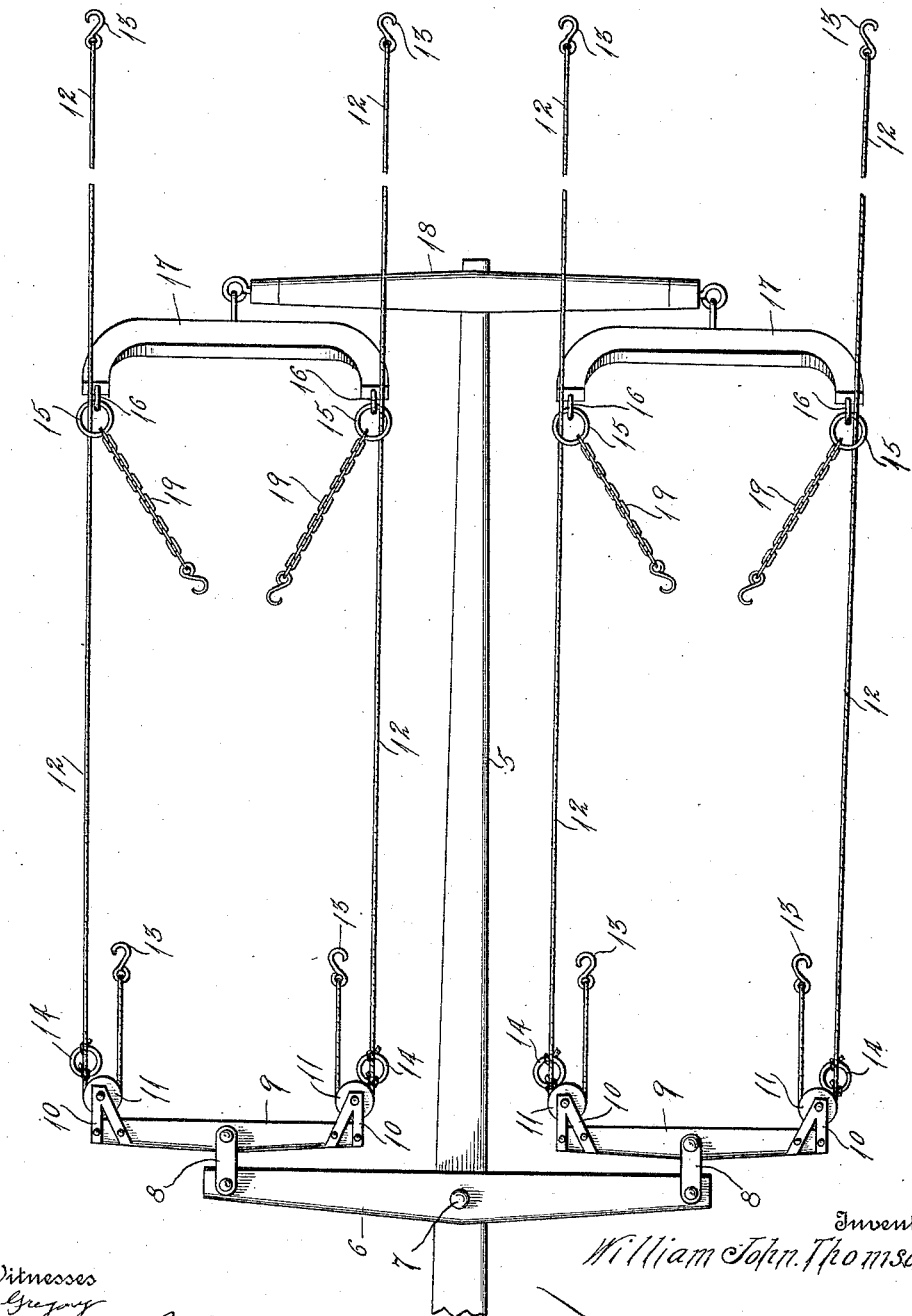

UNITED STATES PATENT OFFICE.

WILLIAM J. THOMSON, OF GRAND VIEW, MANITOBA, CANADA.

DRAFT-EQUALIZER.

1,051,528. Specification of Letters Patent. Patented Jan. 28, 1913.

Application filed August 9, 1910. Serial No. 576,273.

*To all whom it may concern:*

Be it known that I, WILLIAM JOHN THOMSON, a subject of the King of England, residing at Grand View, in the Province of Manitoba, Dominion of Canada, have invented certain new and useful Improvements in Draft-Equalizers; and I do hereby declare the following to be a full, clear, and exact description of the invention, such as will enable others skilled in the art to which it appertains to make and use the same.

The invention relates to improvements in draft equalizers, and the object in view is the construction of an improved draft equalizer particularly adapted for connecting four horses to a vehicle, by means of flexible connecting cables or chains operating on pulleys suitably mounted on the ends of whiffletrees and provided with movement limiting rings, the short ends of the connecting cables or chains being secured to the traces of the rear horses and the longer ends of the cables or chains being passed through guide rings on the neck yokes of the rear horses and connected with the traces of the forward horses.

With the above and other objects in view the invention consists in certain combinations, and arrangements of parts, clearly described in the following specification and clearly illustrated in the accompanying drawings, in which:—

The figure is a plan view of the improved draft equalizer.

Referring to the accompanying drawings illustrating the preferred embodiment of the invention 5 denotes the pole of a vehicle on which the equalizing bar 6 is pivoted by the bolt 7. On the ends of the equalizing bar 6 clips 8 are pivotally secured, and each clip is pivotally connected to a whiffletree 9. On the ends of each whiffletree V-shaped brackets 10 are mounted and on the outer ends of said brackets pulleys 11 are pivoted.

Connecting cables or flexible chains 12 operate on the pulleys 11, and on the ends of said cables or flexible chains hooks 13 adapted to be connected with the traces of the draft animals are arranged. Rings 14 are arranged on the rear portions of the cables or flexible chains and are adapted to abut against the pulleys 11 while the adjacent ends and hooks of said cables or chains extend but slightly in advance of the whiffletrees 9 so as to connect with the traces of the rear horses while the other ends of the cables or chains extend a considerable distance forwardly in advance of the rear draft animals so as to connect with the traces of the forward horses. The forward ends or longer links of the cables or chains 12 are passed through guide rings 15 pivotally connected by links 16 to the neck yokes 17 of the rear horses which yokes may be suitably connected by a bar 18 and the yokes 17 are held in place on the collars of the rear draft animals by means of chains 19.

It will be seen that when the pull of one of the draft animals on one side of the pole 5 exceeds that of the other animal on the same side the connecting cables or chains attached to the traces of the draft animals will instantly give so as to equalize the draft. The rings 14 serve to limit the rearward movement of the longer lengths of the cables or chains.

My improved draft equalizer is exceedingly simple in construction and can be manufactured very cheaply.

The rings 14 can be secured in different places on the cables or flexible chains 12 so that the relation between the hooks on the rear ends of the cables or chains can be varied with relation to the pulleys and the forward ends of the cables or chains.

Having described my invention, what is claimed as new, is:—

1. In a draft equalizer, a vehicle pole, an equalizing bar pivoted on the pole, whiffletrees pivoted to the ends of said bar, V-shaped brackets having their leg portions rigidly secured to the upper faces of the end portions of the whiffletrees and extending forwardly, pulleys rotatably supported in a horizontal position by said brackets, flexible cables movable on the pulleys and carrying attaching means at their ends, rings secured to the cables outwardly of the pulleys for limiting the movement of said cables on said pulleys, said rings being located near the rear ends of the cables than the forward ends of the cables to limit the forward pull of the rearwardly located draft animals, a bar secured to the forward end of the pole, curved yokes loosely supported by the ends of said bar, links secured to the rearwardly curved extremities of said yokes receiving the forwardly extending cables to retain the same in the same spaced relation at all times for attachment of forwardly located draft animals and a collar attaching chain connected to each ring.

2. The combination with a vehicle pole, an equalizing bar pivoted to the pole and swingletrees pivoted to the extremities of the bar; of a bar pivoted to the forward extremity of the pole, rigid yoke members having rearwardly curved extremities, said yoke members being centrally pivoted to the extremities of the last bar, supporting members for the yoke including rings attaching the same to each extremity of the yoke, pulleys at the extremities of each swingletree and cables passing around the pulleys through the rings, said cables having means at their extremities for attachment to draft animals forwardly and rearwardly of the yoke held in spaced parallel relation by the pulleys and by engagement through the rings at the extremities of the yoke, whereby engagement of the cables against the draft animals is prevented.

In testimony whereof, I affix my signature, in presence of two witnesses.

WILLIAM J. THOMSON.

Witnesses:
JOHN BANNING,
PETER MCINTYRE.

Copies of this patent may be obtained for five cents each, by addressing the "Commissioner of Patents, Washington, D. C."